United States Patent [19]

Donohoe

[11] 3,922,495

[45] Nov. 25, 1975

[54] DIGITAL SIGNALING ON A PULSE CODE MODULATION TRANSMISSION SYSTEM

[75] Inventor: Douglas Carroll Donohoe, New Monmouth, N.J.

[73] Assignee: Bell Telephone Laboratories, Incorporated, Murray Hill, N.J.

[22] Filed: Apr. 24, 1974

[21] Appl. No.: 463,532

[52] U.S. Cl. .......... 179/15 BY

[51] Int. Cl.² .......... H04J 1/14

[58] Field of Search .......... 179/15 BY, 15 AT, 15 BC

[56] References Cited

UNITED STATES PATENTS

| | | | |
|---|---|---|---|
| 3,030,448 | 4/1962 | Leonard | 179/15 BY |
| 3,358,082 | 12/1967 | Helm | 325/38 R X |
| 3,359,373 | 12/1967 | Anderson | 179/15 BY |
| 3,806,654 | 4/1974 | Dooley | 179/15 AT X |

*Primary Examiner*—Kathleen H. Claffy
*Assistant Examiner*—E. S. Kemeny
*Attorney, Agent, or Firm*—Daniel D. Dubosky; John K. Mullarney

[57] ABSTRACT

In a pulse code modulation transmission system in which voice information is coded and transmitted on message digit spaces and signaling information is digitally transmitted on signaling digit spaces in sequence with the message digit spaces, two-state present condition unidigit on-hook and off-hook signaling information and multistate multidigit signaling information as, for example, address signaling, are combined for transmission in a single signaling bit space by forming a digit-by-digit modulo-2 sum between a binary representation of the two-state signaling information and each bit in the multistate signaling words. The resultant sum is transmitted bit-by-bit in a single signaling digit space in sequence with each group of pulse code modulation coded message digits. At the receiver, the transmitted multistate signaling information is recovered by forming a modulo-2 sum between the successively received signaling bits and a present condition bit stored at the receiver. The present condition bit stored at the receiver is updated when the modulo-2 summation at the receiver generates a unique sequence of binary digits from which a transition in the two-state signaling information at the transmitter can be detected.

9 Claims, 5 Drawing Figures

DIGITAL SIGNALING ON A PULSE CODE MODULATION TRANSMISSION SYSTEM

BACKGROUND OF THE INVENTION

This invention relates to the transmission of signaling information in a minimum number of digit spaces on a digital communicatiions system.

As communications systems such as the telephone network become increasingly oriented to an all-digital environment, including the use of digital switching equipment, provisions must be made to accommodate the transmission of digital signaling information between, for example, telephone central offices. Thus, the multichannel carrier trunks carrying the pulse code modulation representations of the multiple voice messages must also be modified to carry the signaling information associated with each of the coded voice messages on the trunk.

One signaling system known as the common-channel-interoffice-signaling system employs a separate data channel to transmit highly coded signaling information for a plurality of voice channels. However, the coded voice channels couold be and often are physically disassociated from the signaling data channel such that the signaling information is often transmitted over transmission facilities different than the facilities used for the coded voice channels thereby causing security and reliability problems.

A method of associating the signaling information with its corresponding voice channel is to use a digit space of each coded channel for the transmission of signaling information. In the past, one digit space of each voice channel has been used as a signaling digit space to transmit present condition two-state signaling information such as the on-hook condition of the channel. In order, however, for addititonal multistate signaling information, such as address signaling and traveling class marks, to be simultaneously transmitted with the present condition of the channel, channel message digit spaces were utilized thereby causing a degradation in the quality of the coded voice signal.

An object of the present invention is to simultaneously transmit in a minimum of signaling digit spaces both two-state present condiitiion signaling information and multistate signaling information on a pulse code modulation communications system.

SUMMARY OF THE INVENTION

In accordance with the present invention, both two-state present condition signaling information and multistate signaling information is simultaneously transmitted on a digital channel using only one bit of channel bandwidth. In the pulse code modulation communications system employing the present invention, input message information is converted into successive pulse code message groups, each group having a predetermined number of message digit spaces. At the transmitter, the two-state signaling information is converted intot a unidigit binary representation of the present condition of the channell and the multistate signaling information is coded into a string of multidigit coded binary words. The two-state signaling information and the multistate signaling information are combined by forming a modulo-2 sum between the binary representation of the two-state signaling information and each bit of the multidigit multistate information. The resultant sum is then transmitted digit-by-digit in a signaling digit space that is in sequence with some or all of the pulse code message groups. At the receiver, a digit-by-digit modulo-2 summation is made between the successively received bits in the signaling digit spaces and a unidigit binary representation of the present channel condition which is stored in a receiver memory. In the absence of a transition in the transmitted present condition, the string of digits generated from the modulo-2 summation is equal to the digits of the transmitted multistate words. Therefore, the transmitted multistate signaling words can be detected in the string of received binary digits and the transmitted two-state signaling information is equal to the present condititon stored in the receiver memory. When a transition in the two-state signaling information occurs at the transmitter, the successive digits generated by the modulo-2 summation at the receiver will form a unique string of bits from which a transition of the present condition can be detected. When a two-state transition is detected, the receiver memory is updated with a unidigit binary representation of the new present channel condition.

DETAILED DESCRIPTION

Figure 1A:
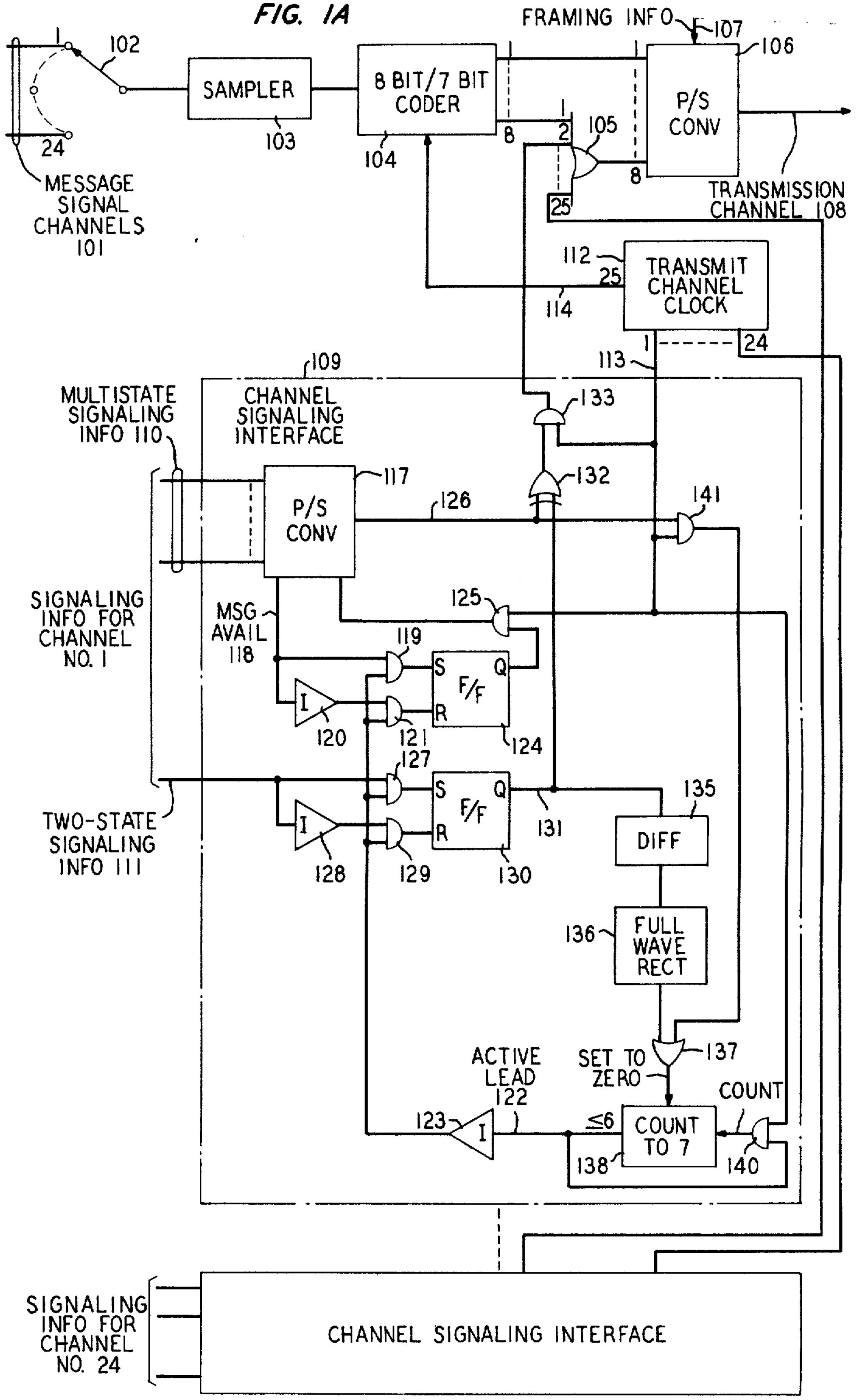
FIGS. 1A and 1B, when arranged side by side, with FIG. 1A to the left of FIG. 1B, are schematic block diagrams of a multichannel pulse code communication system that employs an embodiment of the present invention.
Figure 1B:
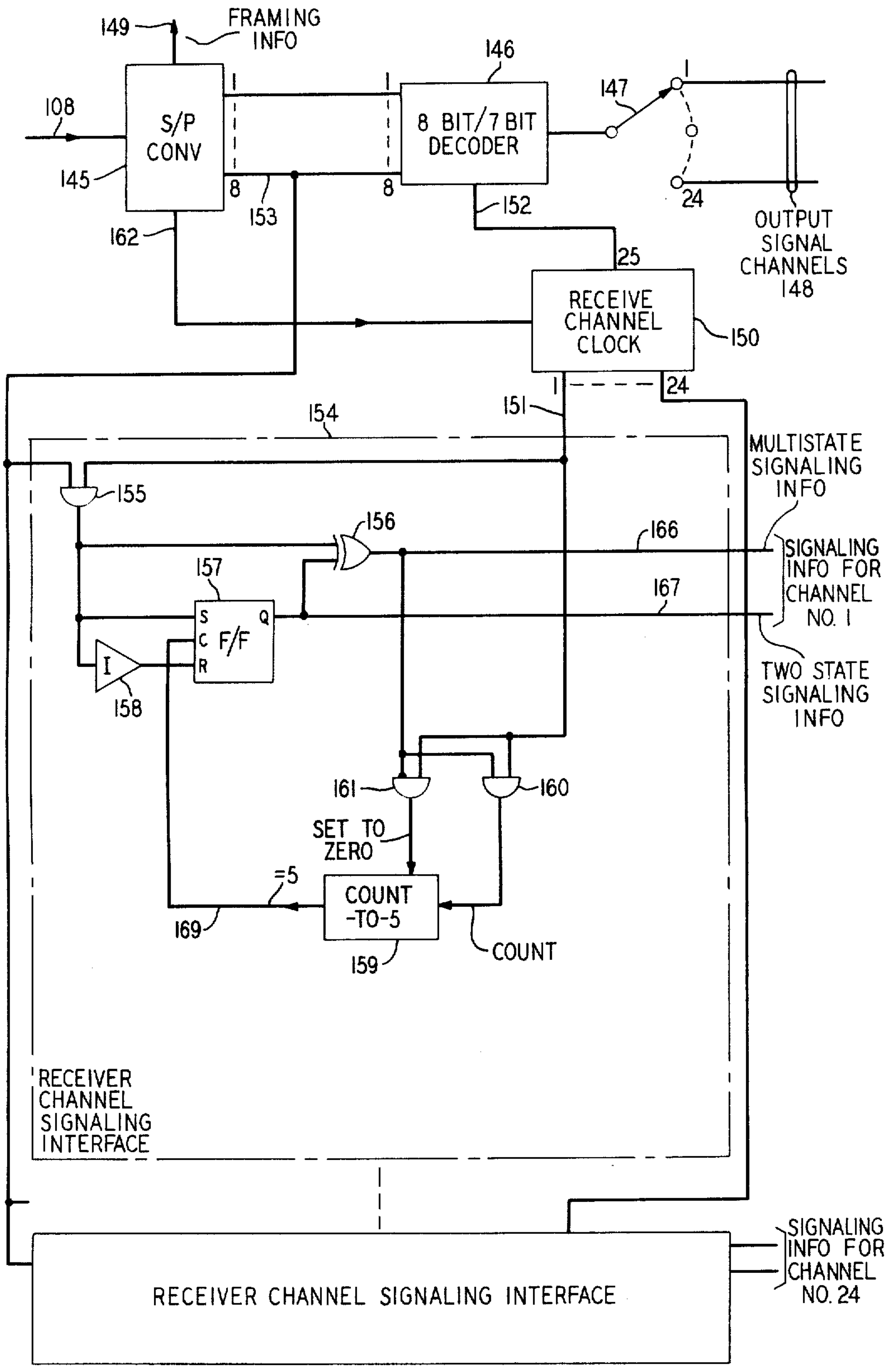

In accordance with the present invention, one embodiment of which is illustrated in FIGS. 1A and 1B, both two-state signaling information and multistate signaling information are simultaneously transmitted on a digital channel using only one bit of message bandwidth.

Figure 2A:
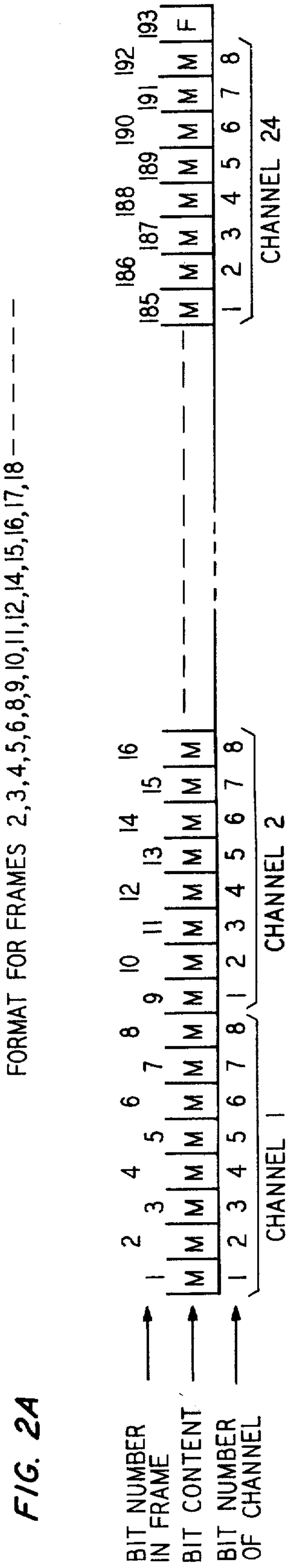
FIG. 2A illustrates the grouping of multiple coded channels onto a single digital message frame for transmission.
Figure 2B:
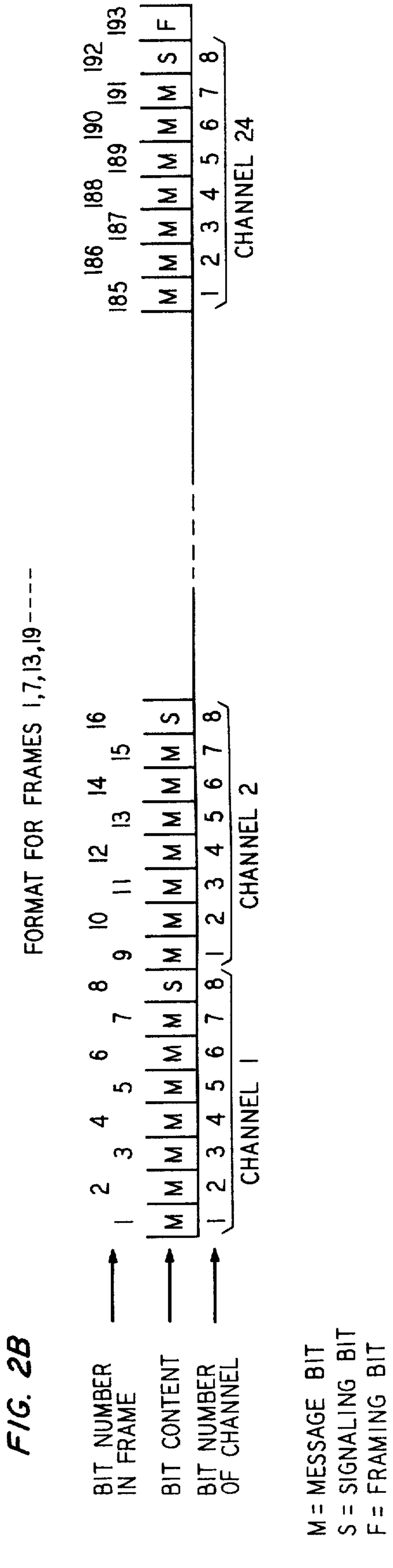
FIG. 2B illustrates a signaling frame in which one digit of each coded channel is allocated for the transmission of signaling information.

The present invention will be described hereinafter for use in conjunction with the $D_2$ channel bank for transmission over T1 digital line facilities. The D2 channel bank and its associated digital transmission of coded information is described in the *Bell System Technical Journal*, Volume 51, No. 8, October 1972, pages 1641–1765. In accordance with the coding format employed by the D2 channel bank, illustrated in FIG. 2A, 24 8-bit PCM coded voice channels are timed-division-multiplexed with a single framing bit to form a 193 bit T 1 frame having a frame repetition rate of 8 kHz. In every sixth frame, however, as illustrated in FIG 2B, the 24 voice channels are sampled and coded into 7-bit PCM and the 8th bit of each time-division channel is used to transmit signaling information. In accordance with the embodiment of the present invention disclosed hereinafter, the signaling information in the 8th bit every sixth frame of each of the 24 time-division-multiplexed coded voice channels contains signaling information for that individual channel. Thus, signaling information for each of the 24 voice channel is physically associated with the PCM coded analog voice information and remains associated throughout successive frame rearrangements.

In particular, the type of signaling information that is transmitted in the signaling bit location is two-state information representing, for example, the present on-hook amd off-hook condition of the channel, and multistate coded signaling information representing, for example, address signaling and traveling class marks. In the embodiment of the present invention discussed hereinafter, the multistate information is coded into fixed length N-bit words in which M-bits out of the N-bits are binary 1's. Furthermore, each signaling message train comprising a series of N-bit words is preceded and terminated by unique START and STOP codes, respectively, that disobey the M-out-of-N constraint. In the present embodiment, the multistate coded signaling information is coded on a two-out-of-five basis.

With reference again to FIG. 1A, 24 analog message signal channels 101 representing the 24 voice channels are each successively applied to sampler 103 through switch 102, the latter having an 8 kHz repetition rate. A coder 104 encodes each successive analog sample into an 8-bit PCM word which is represented as a combination of HIGH and LOW potentials on eight parallel output leads. The 8th parallel bit output of coder 104 is connected to a first input of a 25-input OR gate 105. When coder 104 encodes an input sample into an 8-bit PCM word, the 2nd through 25th inputs of OR gate 105 are predetermined to be binary 0's. Thus, the output of OR gate 105 is equal to the 8th bit output of coder 104. The first seven parallel output leads from coder 104 and the output from OR gate 105 are connected to a parallel-to-serial converter 106. Parallel-to-serial converter 106 converts the 24 successive 8-bit PCM parallel words corresponding to each of the input channels 101, together with one framing bit determined from framing information terminal 107, into the T1 line format comprising 193 serial bits. The output of parallel-to-serial converter 106 is then serially transmitted over a transmission channel 108 to a distant receiving station.

As heretofore discussed, in every 6th frame, the 8th bit of each of the 24 time-division-multiplexed channels is used to transmit signaling information. In order that the signaling information corresponding to each of the 24 input channels be transmitted in the proper bit position, 24 channel signaling interfaces are employed to interconnect 24 sources of signaling information with parallel-to-serial converter 106. The channel signaling interface 109 corresponding to message signal channel No. 1 is illustrated in FIG. 1A. The other 23 channel signaling interfaces are not illustrated in detail but are identical to channel signaling interface 109. The signaling information to be transmitted in the 8th bit of the first message channel in every 6th frame is derived from the multistate signal information on parallel inputs 110 and the two-state signaling information on the input 111.

A transmit channel clock 112 having an output connected to each of the channel signaling interfaces, generates clock pulses every 6th frame at the successive 8th bit time location of each message channel. There is thus an 8-bit phase delay between clock pulses on successive transmit channel clock output terminals 1 through 24. Transmit channel clock output terminal 1 corresponding to channel No. 1 is connected by way of line 113 to channel signaling interface 109. A 25th output terminal of transmit channel clock 112 is connected by way of line 114 to coder 104. The clock pulses on output terminal 25 of transmit channel clock 112 trigger coder 104 into a 7-bit coding state. Thus, every 6th frame coder 104 codes each of the 24 message signal channel samples into a 7-bit PCM word and forces the 8th bit of each coded channel word out of coder 104 to a binary 0.

In accordance with the present invention, the multistate signaling information and the two-state signaling information for each channel are combined by forming a bit-by-bit modulo-2 summation between the individual bits of each N-bit multistate word and the unidigit binary representation of the two-state signaling information. The resultant sum is then transmitted bit-by-bit in the 8th bit position of the corresponding message channel every 6the frame. In order to prevent possible decoding inaccuracies, certain constraints are placed on the multistate and two-state signaling information before the modulo-2 summation is made. Thus, a transition in the two-state signaling information is inhibited while a series of multistate signaling words are being transmitted. Similarly, a string of multistate signaling words is inhibited while a transition in the two-state signaling information is occuring.

With reference again to FIG. 1A, the multistate signaling information at terminals 110 is applied to channel signaling interface 109 in parallel format on a word-by-word basis, where, as heretofore discussed, a string of signaling words is preceded and terminated by a unique START and STOP word, respectively. The multistate signaling words may be derived from a switching center or switching interface located prior to the channel signal interface 109. Terminals 110 are connected to parallel-to-serial converter 117. When a digital word is applied to parallel-to-serial converter 117, message available lead 118 is energized indicating that multistate signaling information is ready for transmission. Message available lead 118 is connected to AND gate 119 and to an inverter 120. The output of inverter 120 is connected to AND gate 121. In a manner to be discussed to be discussed hereinafter, the potential of active lead 122 gives an indication as to whether a transition is occuring at terminal 111. Thus, when active leas 122 is energized and a multistate signaling word is applied to parallel-to-serial converter 117 on terminals 110, an output of parallel-to-serial converter 117 is inhibited until active lead 122 is deenergized. Active lead 122 is connected to inverter 123, the output of the latter being connected to AND gates 119 and 121. The output of AND gates 119 and 121 are connected to SET and RESET inputs of flip-flop 124, respectively. The Q-output of flip-flop 124 is connected to AND gate 125. Transmit channel clock 112 output terminal 1 is connected by way of line 113 to a second input of AND gate 125 and the output of the latter is connected to parallel-to-serial converter 117.

As aforenoted, when a two state transition occurs on terminal 111, the active lead 122 is energized and thus the output of inverter 123 represents a logical 0. With a 0 at one input of AND gate 119, the energizing signal on message available terminal 118 is prevented from reaching the SET input of flip-flop 124. The output Q of flip-flop 124 will thus remain in a previously reset deenergized state representing a logical 0. With a logical 0 at one input of AND gate 125, the clock pulses from transmit channel clock 113 terminal 1 are prevented from reaching the output of AND gate 125. The output of AND gate 125 controls the rate at which parallel-to-serial converter 117 transforms the multistate signaling words at terminals 110 into a serial format and transmits the serial code bit-by-bit over the line 126. When the output of AND gate 125 is deenergized, however, parallel-to-serial converter 117 does not produce an output on line 126, but instead retains in a buffer the multistate signaling words until clock pulses are again present at the output of AND gate 125.

When active lead 122 is deenergized, indicating that the two-state transition on terminal 11 is completed, ANd gate 119 is enabled and the energized message available terminal 118 triggers the SET input of flip-flop 124. Therefore, the Q-output of flip-flop 124 is energized, representing a logical 1, and AND gate 125 is enabled. Thus, clock pulses from transmit channel clock 112 output terminal 1 are applied, by way of line 113, to parallel-to-serial converter 117. Parallel-to-serial converter 117 thus transmits on line 126 and at the clock pulses rate of transmit channel clock 112, the serial representation of the miltistate signaling words at terminals 110. In a manner to be discussed hereinafter, the transmission of a signal over line 126 energizes active lead 122. Therefore, AND gates 119 and 121 are disabled and the SET input of flip-flop 124 is deenergized. However, since the RESET input of flip-flop 124 is similarly disabled, flip-flop 124 remains in its last state and thus the Q-output of flip-flop 124 remains energized. Thus, the clock pulses from transmit channel clock 112 output terminal 1 continue to pass, by way of line 113, through AND gate 125 to parallel-to-serial converter 117 and the latter continues to transmit digital serial information over terminal 126. When all the multistate signaling information words present at input terminals 110 have been serially transmitted over terminal 126, acitve lead 122 and message available lead 118 are both deenergized. Therefore, AND gates 119 and 121 are enabled and the resultant logical 1 at the output of inverter 120 triggers the RESET input of flip-flop 124. The Q-output of flip-flop 124 is thus deenergized thereby inhibiting further clock pulses from passing through AND gate 125 to parallel-to-serial converter 117.

Transitions in the two-state signaling information at terminal 111 are similarly delayed while multistate signaling information is being transmitted by paralell-to-serial converter 117 over line 126. Terminal 111 is connected to AND gate 127 and inverter 128. The output of inverter 128 is connected to AND gate 129. Active lead 122 is connected through inverter 123 to second inputs of AND gates 127 and 129. The output of AND gate 127 is connected to the SET input of flip-flop 130, and the output of AND gate 129 is connected to the RESET input of flip-flop 130. The Q-output of flip-flop 130 is connected to terminal 131. In a manner to be described hereinafter, active lead 122 is energized when multistate signaling information is being transmitted by parallel-to-serial converter 117 over terminal 126. Thus the output of inverter 123 is deenergized representing a logical 0, during these intervals, and AND gates 127 and 129 prevent a transition in the two-state signaling information at terminal 111 from reaching either the SET or RESET inputs of flip-flop 130. Thus, during the interval in which active lead 122 is energized, flip-flop 130 remains in its previously SET or RESET state. When the multistate signaling information has been terminated transmission on line 126 and active lead 122 is deenergized, AND gates 127 and 129 are enabled. Thus, if there has been a transition in the two-state signaling information from an off-hook logical 1 on terminal 111 signaling information on terminal 111 while multistate signaling information was being transmitted over terminal 126, the resultant logical 1 at the output of inverter 128 triggers the RESET input of flip-flop 130. The Q-output of flip-flop 130 is thus deenergized and the signal on terminal 131 is a logical 0, the representation of the new on-hook two-state signaling information.

Similarly, a transition in the two-state signaling information from an on-hook logical 0 to an off-hook logical 1 triggers the SET input of flip-flop 130 to produce a transition from a logical 0 to a logical 1 on terminal 131 connected to the Q-output of flip-flop 130. Each transition at the Q-output of flip-flop 130 causes, in a manner to be discussed hereinafter, active lead 122 to become energized and remain energized for a predetermined time interval. Thus, as heretofore discussed, a multistate signaling information at terminals 110 is prevented from reaching line 126 of parallel-to-serial converter 117 during those intervals in which a transition occurs at flip-flop 130.

Line 126 from parallel-to-serial converter 117 and output terminal 131 from flip-flop 130 are connected to a first and second input, respectively, of an exclusive OR gate 132. Exclusive OR gate 132 forms a modulo-2 sum on a bit-by-bit basis of the logical unidigit binary representation of the signaling information at the Q-output of flip-flop 130 with each bit of the multistate signaling information transmitted by parallel-to-serial converter 117 over line 126. The output of exclusive OR gate 132 is connected to a first input of AND gate 133. Transmit channel clock 112 output terminal 1 is connected to a second input of AND gate 133 by way of line 113. The output of AND gate 133 is connected to a second of the 25 inputs of OR gate 105. AND gate 133 thus gates the modulo-2 output of exclusive OR gate 132 into the 8th bit location of channel No. 1, every sixth frame. Since the 8th bit output of coder 104 is predetermined to be a 8 0 for each of the 24 input message channels every sixth frame, and the third through 25th inputs of OR gate 105 are logical 0s when coder 104 has a 7-bit coded word from channel No. 1 on its output leads, the ouputs of OR gate 105 will be equal to the logical 0 or 1 at its second input as determined by the output of AND gate 133 and will thus be equal to the modulo-2 sum of the channel No. 1 two-state signaling information and one bit of the channel No. 1 multistate signaling information.

Figure 3:
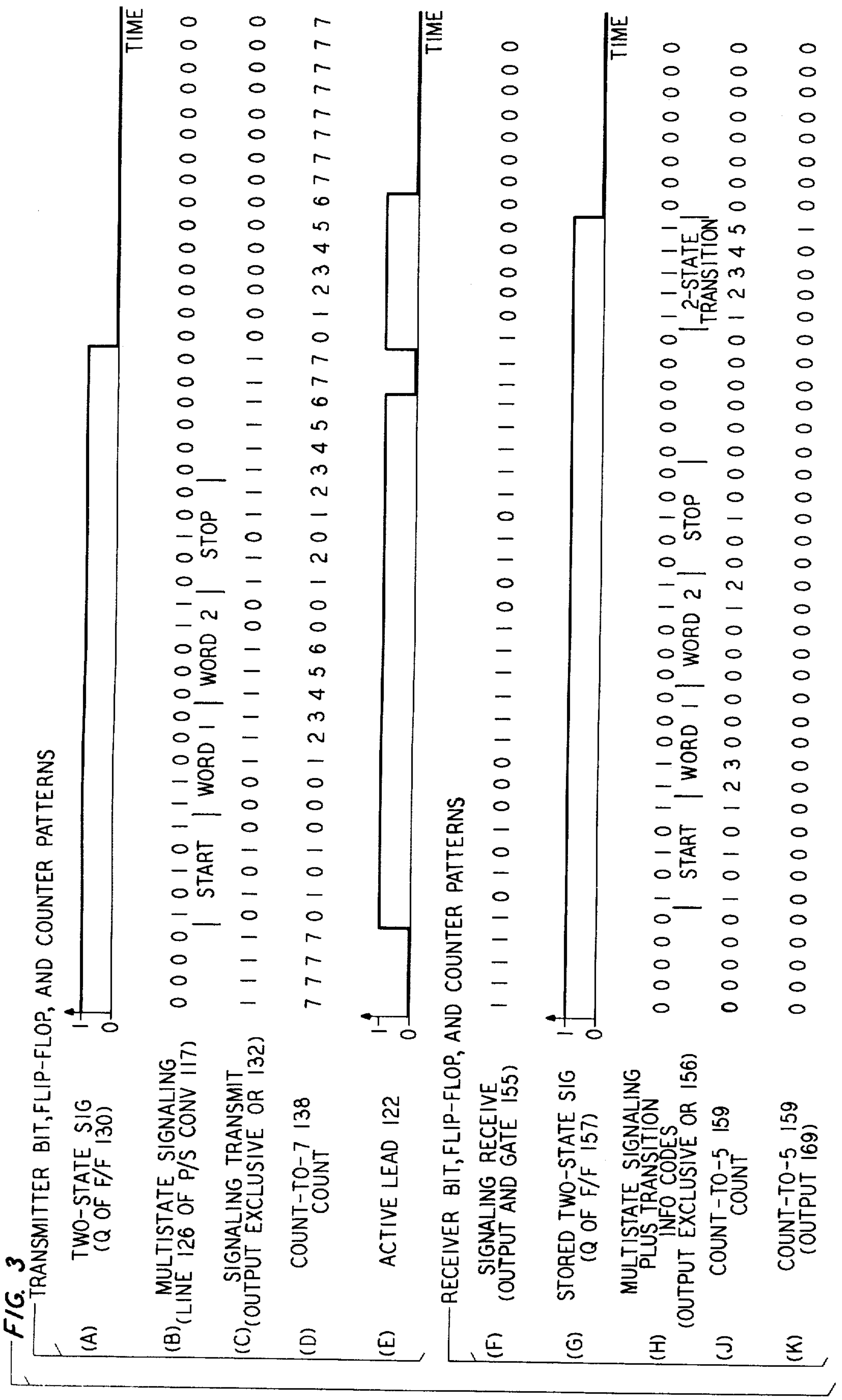
FIGS. 3A and 3B illustrate an example of a sequence of multistate signaling words and two-state signaling information to be transmitted.
FIG. 3C illustrates the bit stream formed by the digit-by-digit modulo-2 sum of the signaling information in FIGS. 3A and 3B.
FIGS. 3D and 3E illustrate the response of apparatus in the transmitter of FIG. 1A to the signalling information of FIGS 3A and 3B.
FIGS. 3F through 3K illustrate the response of apparatus in the receiver of FIG. 1B to the received bit stream of FIG. 3C.

FIGS. 3A and 3B illustrate examples of two-state present condition signaling information and multistate signaling information, respectively, to be transmitted in the 8th bit location every sixth frame of channel No. 1. The two-state information in FIG. 3A thus represents the binary signal at the Q-output of flip-flop 130 in FIG. 1A and the multistate signaling information represents the sequence of binary digits at the output of parallel-to-serial converter 117 in FIG. 1A. Furthermore, the multistate signaling words WORD1 and WORD2 at the output of parallel-to-serial converter 117 are preceded and terminated by START and STOP codes, respectively. FIG. 3C illustrates the bit-by-bit modulo-2 sum of the two-state signaling information in FIG. 3A and the multistate signaling information in FIG. 3B and thus represents the string of binary digits at the output of exclusive OR gate 132 which are successively transmitted over the digital channel in the 8th bit signaling position of channel No. 1 every sixth frame.

With reference again to FIG. 1A, in order to inhibit two-state transitions while multistate information is present or to inhibit multistate information when a two-state transition is present, active lead 122 is made responsive, as mentioned heretofore, to both the presence of multistate information on terminal 126 and two-state transitions on terminal 131. Output terminal 131 of flip-flop 130 is connected to a differentiator 135. Differentiator 135 detects level charges at the output of flip-flop 130 and thus indicates where a transition occurs in the two-state signaling information at terminal 131. The output of differentiator 135 is connected to a full-wave rectifier 136. Full-wave 136 produces a positive pulse output in response to a transition on terminal 131. The output of full-wave rectifier 136 is connected to a first input of OR gate 137, the output of the latter being connected to a set-to-zero input of a count-to-7 counter 138. Active lead 122, connected to the output of count-to-7 counter 138 is energized when the count is less than or equal to 6. Since a two-state transition will generate a positive pulse at the output of full-wave rectifier 136, the resultant logical 1 at the output of OR gate 137 sets count-to-7 counter 138 to the count to zero, thereby energizing active lead 122 to inhibit multistate signaling information at terminal 110 from reaching output terminal 126 of parallel-to-serial converter 117.

Transmit channel clock 112 output terminal 1 is connected to a first input of AND gate 140 by way of line 113, and active lead 122 is connected to a second input of AND gate 140. The output of AND gate 140 is connected to the count input of count-to-7 counter 138. Thus, each clock pulse from terminal 1 of transmit channel clock 112 increases the count of counter 138 by one as long as active lead 122 is energized. Since active lead 122 is deenergized when count-to-7 counter 138 reaches the count of 7, seven clock pulses will be applied to count-to-7 counter 138 following the instant when a two-state transition occurred on terminal 131. Active lead 122 will therefore remain energized to a period of time equal to the transmission of seven clock pulses from transmit channel clock 112 output terminal 1. Multistate signaling information at terminal 110 is thus prevented from reaching terminal 126 for a seven clock pulse interval following a change in the two-state signaling information. When the seventh clock pulse is applied to count-to-7 counter 138 through AND gate 149, active lead 122 is deenergized.

As aforementioned, acitve lead 122 is similarly energized when multistate information is present on terminal 126. Line 126 of parallel-to-serial converter 117 is connected to a first input of AND gate 141. Terminal 1 of transmit channel clock 112 is connected to a second input of AND gate 141 by way of line 113. The output of AND gate 141 is connected to a second input of OR gate 137. AND gate 141 thus gates each binary digit of the multistate signaling information on terminal 126 to OR gate 137 at the clock rate of transmit channel clock 112. When the initial 5-bit START word of a series of 5-bit multistate signaling words is transmitted by parallel-to-serial converter 117 overline 126, a logical 1 is generated by OR gate 137 in response to the initial binary 1 in the START word and each subsequent binary 1 that appears in the stream of digits on line 126. Thus the count of count-to-7 counter 138 is set to zero in response to each binary 1 on terminal 126 thereby energizing active lead 122. It is generally desired therefore to use as a START code a code word beginning with a binary 1 so that active lead 122 is energized as soon as multistate signaling information transmission begins. Once the count-to-7 counter 138 is set to zero, clock pulses are passed to the count input of count-to-7 counter 138 through AND gate 140. As aforementioned acitve lead 122 is deenergized when the count reaches seven. Since, however, the signaling information on terminal 126 is coded such that two-out-of-five digits in a word are binary 1s, the longest string of 0s that could be transmitted over terminal 126 would be six, as for example, the digital word 11000 followed by a digital word 00011. Thus, during the transmission of multistate signaling information over line 126, a binary 1 is applied to OR gate 137 to reset the count of count-to-7 counter 138 to zero before the count reaches 7. Therefore, active lead 122 will remain energized as long a multistate signaling information is present on terminal 126, since the count of count-to-7 counter 138 cannot exceed 6. Once multistate signaling is complete and seven consecutive clock pulses increase the count of count-to-7 counter 138 to 7, active lead 122 is deenergized. When the multistate signaling information is coded into binary N-bits long, where each N bit word contains M-binary 1's, counter 138 would be chosen to count to 2(N—M)+1 in order for active lead 122 to remain energized for the multistate signaling transmission period.

FIG. 3D illustrated the count of count-to-7 counter 138 as determined in response to the two-state signaling information and multistate signaling information in FIGS. 3A and 3B, respectively, Prior to the START word in the string of multistate signaling words, FIG. 3B, the count of count-to-7 counter 138 is at its steady-state count of 7. As heretofore described, the first binary 1 in the START word, sets the count of count-to-7 counter 138 to zero as illustrated in FIG. 3D and thus, as illustrated in FIG. 3E, energizes active lead 122 for the period in which multistate signaling information is present at the output of parallel-to-serial converter 117. Following the binary 1 in the STOP word, count-to-7 counter 138 counts the next seven consecutive binary 0's whereupon at the count of 7, active lead 122 is deenergized, as illustrated in FIGS. 3B, 3D and 3E. When a transition in the present condition two-state signaling occurs as illustrated in FIG. 3A, the count of count-to-7 counter 138 is again set to zero, whereupon the active lead 122 is energized for the next seven consecutive clock pulses as illustrated in FIGS. 3D and 3E.

With reference again to FIG. 1A, the 23 channel signaling interfaces corresponding to the second through the 24the input message channels operate in a manner identical to that discussed for channel signal interface 109. The modula-2 sum of the multistate signaling information and the two-state information for each channel is applied to an appropriate input of OR gate 105, and transmitted to the 8th bit position of the corresponding channel slot every sixth frame.

The reciever terminal that demultiplexes and decodes the digital information transmitted over transmitting channel 108 is illustrated in FIG. 1B. Serial-to-parallel converter 145 receives each serial digital frame comprising the 24 time-division-multiplexed 8-bit channels plus one framing bit, and converts each 8-bit serial channel word into parallel format on eight output leads. The eight output leads of serial-to-parallel converter 145 are connected to decoder 146 which decodes each 8-bit word and applies the appropriate analog equivalent through switch 147 to the proper output signal channel 148. The framing bit which occurs every 193 bits is detected by serial-to-parallel converted 145 and applied to line 149.

As heretofore discussed, at every sixth frame the 8th bit of each received coded channel word contains signaling information that must be separately decoded. A receive channel clock 150 having 24 output terminals generates clock pulses every sixth frame at the successive time location of each message channel. A clock pulse is thus produced on terminal 1 of receive channel clock 150, which corresponds to the time every sixth frame interval during which channel No. 1 information is present on the output leads of serial-to-parallel converter 145. By employing synchronization techniques well known to those in the digital art, receive channel clock 150 is synchronized to the incoming data stream over transmission line 108 and thus to transmit channel clock 112 by way of line 162. Output terminal 25 of receive channel clock 150, upon which clock pulses are generated every sixth frame to each message channel, is connected to decoder 146 by way of line 152. The clock pulses on lune 152 switch decoder 146 into a 7-bit decode mode. Thus, every sixth frame, decoder 146 decodes only the first 7 bits of each channel word since the 8th bit of each channel word is a signaling bit.

The output terminal 8 of serial-to-parallel converter 145, upon which is the 8th bit of each 8-bit channel word, is connected to 24 receiver channel signaling interfaces by way of line 153. Receiver channel signaling interface 154 corresponding to message signal channel No. 1 is illustrated in FIG. 1B. Although not illustrated in detail, the 23 other message signal channels are identical to receiver channel signaling interface 154.

Line 153 is connected to a first output of an AND gate 155 within receiver channel signal interface 154. The second input of AND gate 155 is connected to receive channel clock 150 terminal 1 by way of line 151. Since a clock pulse is generated on terminal 1 of receive channel clock 150 only every sixth frame and in sequence with the eight bits appearing at the output terminals of serial-to-parallel converter 145 that correspond to channel No. 1, AND gate 155 gates only those binary digits on output terminal 8 of serial-to-parallel converter 145 that are channel No. 1 signaling bits. The successive binary digits at the output of AND gate 155 are thus equal to the successive binary digits at the output of exclusive OR gate 132 in FIG. 1A.

The output of AND gate 155 is connected to a first input of an exclusive OR gate 156, the SET input of a clocked S-R flip-flop 157 and an inverter 158. The output of inverter 158 is connected to the RESET input of clocked flip-flop 157. The Q-output of flip-flop 157 is connected to a second input of exclusive OR gate 156. Exclusive OR gate 156 forms a modulo-2 sum between each successive binary digit at the output of AND gate 155 and the binary representation of the state of flip-flop 157 as determined by the signal on the Q-output. A count-to-5 counter 159 which produces an output pulse on terminal 169 when its count reaches 5 is connected to the clock C-input of flip-flop 157. In accordance with the operation of standard clocked S-R flip-flops, a transition occurs at the Q-output of flip-flop 157 at only that time when a transition occurs at its clock C-input. Thus only when the count of count-to-5 counter 159 reaches 5 can the state of flip-flop be changed.

Flip-flop 157 is initially set so that the binary signal on the Q-output represents the present condition of the two-state signaling information at the Q-output of flip-flop 130 in FIG. 1A. If it is assumed for exemplary purposes that only uniform two-state signaling information is being transmitted over transmission channel 108 in the 8th bit position of channel No. 1 such that each binary bit at the output of AND gate 155 is equal to the binary signal on the Q-output of flip-flop 157, than each bit generated by exclusive OR gate 156 is binary 0. Thus, during quiescent periods in which only the steady-state condition of the channel is being transmitted in the signaling digit spaces the signal at the output of exclusive OR gate on terminal 166 will be a string of binary 0's representing the absence of multistate signaling information. Similarly, the signal on output terminal 167 connected to the Q-output of clocked flip-flop 157 will be a binary signal representing the transmitted two-state present condition signaling information for channel No. 1. Flip-flop 157 thus performs the function of storing a previously detected two-state present condition of the channel.

In a manner to be discussed hereinafter, the two-state information stored in flip-flop 157 is updated in response to a transition in the transmitted present condition of the channel. The output of exclusive OR gate 156 is connected to AND gate 160 and to a negate-input of AND gate 161. Receive channel clock 150 output terminal 1 is connected to second inputs of both AND gates 160 and 161 by way of line 151. The output of AND gate 160 is connected to the count input of count-to-5 counter 159, and the output of AND gate 161 is connected to a set-to-zero input of count-to-5 counter 159. When at each clock instant, the output of exclusive OR gate 156 is a binary 0, the output of AND gate 161 is energized such that the count of count-to-5 counter 159 is set to zero. Thus, during quiescent periods in which only uniform two-state signaling information is being transmitted, the count of count-to-5 counter 159 remains at zero.

When a transitionn occurs at the Q output of flip-flop 130 in FIG. 1A, indicative of a change in the present condition of the channel, the binary digit at the output of AND gate 155 differs from the binary signal at the Q output of flip-flop 157. A binary 1 is therefore produced at the output of exclusive OR gate 156 which is passed through AND gate 160 at the clock pulse instant to increase the count of count-to-5 counter 159 to one. Once a change in the present condition of the channel occurs, each next successive digit at the output of AND gate 155 differs from the binary representation of the present condition stored by flip-flop 157 and represented by the binary signal on the Q-output. Thus, the output of exclusive OR gate 156 is a series of successive binary 1's, wherein each successive binary 1 increases the count of count-to-5 counter 159 by one. After exclusive OR gate 156 generates five consecutive binary 1's, the count of the count-to-5 counter 159 reaches 5 and an output pulse is produced on output lead 169 thereby triggering the clock C input of flip-flop 157. When the clock C-input of flip-flop 157 is triggered, the binary representation of the new present condition signaling information at the output of AND gate 155 changes the state of flip-flop 157. Thus, if the output of AND gate 155 is a binary 1, the SET input of flip-flop 157 will be triggered to energize the Q-output. Similarly, if the output of AND gate 155 is a binary 0, the RESET input of flip-flop 157 will be triggered to deenergize the Q-output. Since the binary representation of the Q-output of flip-flop 157 is thereafter equal, in the absence of multistate signaling information, to the binary digit of the output of AND gate 155, the output of exclusive OR gate 156 is a binary 0 which sets count-to-5 counter 159 to zero.

When multistate signaling information is transmitted by parallel-to-serial converter 117 in FIG. 1A, the first bit at the output of AND gate 155, equal to the modulo-2 sum of the initial binary 1 in the transmitted START word and the Q-output of flip-flop 130, differs from the Q-output of flip-flop 157. The output of exclusive OR gate 156 is thus a binary 1 which increases the count of count-to-5 counter 159 to 1. Since only four consecutive binary 1's can appear at the output of parallel-to-serial converter 117 in FIG. 1A, (the word 00011 followed by the word 11000) and thus at the output of exclusive OR gate 156 in FIG. 1B, the count of count-to-5 counter never reaches five before a binary 0 at the output of exclusive OR gate 156 sets the count to zero through AND gate 161. Thus flip-flop 157 cannot be accidentally set or reset when multistate signaling words are being detected at the output of exclusive OR gate 156. Furthermore, in order to prevent an accidental setting or resetting of flip-flop 157 at the beginning or end of a multistate signaling word stream, the START code is chosen so that its last three bits are not consecutive binary 1's, and the STOP code is chosen so that its first 3 bits are not consecutive binary 1's.

The successive binary digits at the output of exclusive OR gate 156 on line 166 can thus be grouped to be equal to the transmitted multistate signaling word and can be applied to a switching interface for decoding. As aforenoted, however, when a two-state transition occurs, a series of five consecutive 1 appears on line 166. Since this violates the two-out-of-five coding scheme employed in the transmission of multistate signaling information, a switching interface can be programmed to recognize five consecutive binary 1's as an indication of a two-state signaling transition.

The output on line 167 is equal to the transmitted two-state present condition signaling information delayed by the 5-bit detecting interval. Therefore, both the multistate signaling information at input terminals 110 and the two-state signaling information at terminal 111 of channel signaling interface 109 in FIG. 1A are detectable at the output lines 166 and 167, respectively, at receiver channel signaling interface 154 in FIG. 1B. Thus, by using only 1 bit of message bandwidth both multistate signaling information and two-state signaling information have been transmitted and separately decoded at a distant receiver.

FIG. 3F illustrates a stream of binary digits at the output of AND gate 155 in the receiver of FIG. 1B equal to the stream of binary digits at the output of exclusive OR gate 132 in FIG. 1B, as illustrated in FIG. 3C, but offset by an assumed one-bit transmission channel delay. As illustrated in FIG. 3G, flip-flop 157 is assumed to be previously set to that its Q-output is energized. Thus, the output of exclusive OR gate 156 in FIG. 3H, is a binary 0 until a binary 0 appears at the output of AND gate 155. When a binary 0 appears at the output of AND gate 155, the output of exclusive OR gate 156 becomes, as illustrated in FIG. 3H, a binary 1. Simultaneously, the count of count-to-5 counter 159, as illustrated in FIG. 3J, is increased to one. As illustrated in FIG. 3H, the subsequent digits at the output of exclusive OR gate 156 are equal to the successive digits of the transmitted multistate signaling words on line 126 in FIG. 1A, as illustrated in FIG. 3B. Since, as illustrated in FIG. 3J, the count of count-to-5 counter 159 does not reach 5 while multistate signaling bits are being detected at the output of exclusive OR gate 156, the Q-output of flip-flop 157 remains unchanged. However, when the string of binary digits at the output of AND gate 155 is combined with the Q-output of flip-flop 157 by exclusive OR gate to generate five consecutive binary 1's, as illustrated in FIGS. 3F, 3G and 3H, the count of count-to-5 counter 159 reaches 5, as illustreated in FIG. 3J. An output pulse is thus produced by count-to-5 counter 159 on line 169, as illustrated in FIG. 3K and flip-flop 157 is thereupon reset in response to the binary 1 at the output of inverter 158. The Q output of flip-flop 157 is deenergized, as illustrated in FIG. 3G, and the subsequent binary digits at the output of exclusive OR gate 156 are binary 0's, as illustrated in FIG. 3H, until either another two-state transition of additional multistate signaling is received.

With reference again to FIG. 1B, if the multistate signaling information is coded by a more general M-out-of-N coding sheme, count-to-5 counter 159 would be replaced by a counter that counted to 2M+1.

The 23 receiver channel signaling interfaces corresponding to the second through 23rd message channels operate in an identical manner to that heretofore disclosed for receiver channel interface 154.

Various other modifications of this invention can be made without departing from the spirit and scope of the present invention. For example, the present invention could be implements on a singles channel system. Also, pulse code modulation coding or any other coding sheme, can be employed to encode the message information onto the message digit spaces.

The above described arrangements are illustrative of the application of the principles of the invention. Other embodiments may be devised by those skilled in the art without departing from the spirit and scope thereof.

What is claimed is:

1. A method for simultaneously transmitting two-state signaling information and multistate signaling information over a single reoccurring digit space in a digital transmission system comprising the steps of converting said two-state signaling information into a unidigit binary representation and said multistate signaling information into the multidigit word bit stream, developing on a digit-by-digit basis the modulo-2 sum of said unidigit binary representation and said multidigit word bit stream, and inserting each digit of said modulo-2 sum into said single reoccurring digit space.

2. A method for simultaneously transmitting two-state signaling infomation and multistate signaling information over a single digit space in a digital transmission system comprising the steps of converting said two-state signaling information into a unidigit binary representation and said multistate sinnaling information into a multidigit word bit stream, delaying the conversion of a transition in said two-state signaling information into said unidigit binary representation when said multistate signaling information is being converted into said multidigit word bit stream, delaying the conversion of said multistate signaling information into said multidigit word bit stream when a transition in said two-state signaling information is being converted into said unidigit binary representation, developing on a digit-by-digit basis the modulo-2 sum of said unidigit binary representation and said multidigit word bit stream, and inserting each digit of said modulo-2 sum into said single reoccurring digit space.

3. In the transmitter of a digital transmission system which converts input message information into successive digital message groups, signaling apparatus for transmitting both two-state signaling information and multistate signaling information concurrently with said digital message groups comprising generating means for developing clock pulses to indicate that signaling information is to be transmitted, a modulo-2 adder means having a first and a second input, means responsive to the two-state signaling information for developing a representative logical state at the first input of said modulo-2 adder means, means responsive to the multistate signaling information and to clock pulses from said generating means for developing binary digits at the second input of said modulo-2 adder means which represent in serial form a multistate signaling information, and means for combining the output of said modulo-2 adder means with said digital message groups.

4. Signaling apparatus as defined in claim 3 wherein said apparatus further includes means for delaying the development of said representative logical state in response to a binary digit of a predetermined value and for delaying the development of a binary digit in response to a transition in said representative logical state.

5. Signaling apparatus as defined in claim 4 wherein said means responsive to said multistate signaling information further includes a parallel-to-serial converter having a receiving terminal for receiving said multistate signalling information, a signal indicator terminal for developing a predetermined logical representation when multistate signaling information is present at said receiving terminal, an energizing terminal for receiving pulses, and an output terminal for presenting in serial form the multistate signaling information in response to pulses on said energizing terminal, and gating means connected to said signal indicator terminal, said generating means, and said delaying means to inhibit clock pulses from passing to said energizing terminal in response to a transition in said representative logical state and to otherwise gate clock pulses from said generating means to said energizing terminal when said predetermined logical representation

6. Signaling apparatus as defined in claim 4 wherein said means for delaying includes a transition detecting means for developing a binary 1 in response to a transition in said representative logical state, an OR gate having a first input connected to said transition detecting means and a second input connected to receive the binary digits which represent in serial format the multistate signaling information, a counter having a first and a second input and an output, means connecting said generating means to said first counter input to increase the count of said counter in response to the clock pulses, means connecting the output of said OR gate to said second counter input to set said counter to a first predetermined count in response to a binary 1 at the output of said OR gate, said counter generating a predetermined logical representation on said output when the count of said counter is below a second predetermined count, said second predetermined count being below said first predetermined count, means connecting said counter output to said means responsive to the two-state signaling information and said means responsive to the multistate signaling information wherein said predetermined logical representation is present on said counter output for a predetermined number of clock pulses following a transition in said representation logical state and when binary digits representing said mutlistate signaling information are present at the second input of said modulo-2 adder.

7. In a receiver of a digital transmission system which receives successive digital message groups and signaling information on signaling digit space in sequence with at least some of said successive digital message group, said signaling information in consecutive signaling digit spaces being equal to the modulo-2 sum of a representative logical state of two-state signaling information and each digit of a transmitted serial binary representation of multistate signaling information, the apparatus for separately determining the transmitted two-state signaling information and transmitted multistate signaling information comprising an input terminal, means for separating the signaling digits in said signaling digit spaces from the digital message groups and successively applying the signaling digits to said input terminal, a memory means connected to said input terminal for storing a previously detected transmitted two-state signaling information, said memory means generating a logical representation of said stored previously detected two-state signaling information, a modulo-2 adder means connected to said input terminal and said memory means, detecting means connected to the outpur of said modulo-2 adder means for detecting a predetermined sequence of digits at the output of said modulo-2 adder means, means connecting said detecting means to said memory means to update said stored two-state signaling information in response to an output from said detecting means, wherein the transmitted multistate signaling information can be detected in the successive digits at the output of said modulo-2 adder means and the transmitted two-state signaling information can be determined by the logical representation at the output of said memory means.

8. The apparatus for separately detecting the transmitted two state signaling information and transmitted multistate signaling information as defined in claim 7 wherein said detecting means includes a digital counter for counting a predetermined number of successive predetermined binary digits at the output of said modulo-2 adder means the stored two-state signaling information in said memory means being updated only when said counter reaches said predetermined count.

9. In an N-channel telephone system which converts telephone message samples of each of said N-channels into successive binary message code words, signaling apparatus for concurrently transmitting with said binary message code words of each channel on-hook and off-hook present condition signaling information and multistate binary signaling code words for each channel, said signaling apparatus comprising generating means for developing clock pulses to indicate that signaling information is to be transmitted, N-modulo-2 adder means each having a first and second input, each one of said adder means corresponding to a designated one of said N-channels, means responsive to the present condition signaling information for each channel for developing at the first input of each corresponding modulo-2 adder means a logical 1 when the corresponding channel is in the off-hook state and a logical 0 when the channel is in the on-hook state, means responsive to the signaling code words for each channel and said clock pulses from said generating means for developing at the second input of each corresponding modulo-2 adder means binary digits which represent in serial form the multistate signaling information for the corresponding channel, and means for combining for each of said N-channels in the binary message code words and the output of the corresponding modulo-2 adder means.

* * * * *

UNITED STATES PATENT OFFICE

CERTIFICATE OF CORRECTION

Patent No. 3,922,495 Dated November 25, 1975

Inventor(s) Douglas C. Donohoe

It is certified that error appears in the above-identified patent and that said Letters Patent are hereby corrected as shown below:

Column 1, line 8, change "communicatiions" to --communications--; line 24, change "couold" to --could--; line 36, after "on-hook" insert --and off-hook--; line 45, change "condiitiion" to --condition--; line 60, change "intot" to --into--; line 61, change "channell" to --channel--. Column 2, line 13, change "condititon" to --condition--; line 42, change "signalling" to --signaling--; line 65, change "T 1" to --T1--. Column 4, line 26, change "6the" to --6th--; line 51, delete "to be discussed", second occurrence. Column 5, line 21, change "ANd" to --AND--; line 55, change "paralell" to --parallel--. Column 6, line 8, after "has" delete --been--; line 12, after "terminal 111" delete --signaling information--; line 12, after "terminal 111" insert --to an on-hook logical 0--; line 50, change "8" to --logical--. Column 7, line 23, after "fullwave" insert --rectifier--; line 34, after "count" change "to" to --of--; line 58, change "149" to --140--.

Column 8, line 64, change "modula" to --modulo--. Column 9, line 13, change "converted" to --converter--; line 33, change "lune" to --line--;line 45, change "output" to --input--. Column 11, line 45, change "1" to --1's--. Column 12, line 1, change "to" to --so--. Column 12, line 64, after "single" insert --reoccurring--; line 67, change "sinnaling" to --signaling--. Column 13, line 28, change "a" to --the--; line 55, after "said" second occurrence insert --signal indicator terminal has developed said--. Column 14, line 4, after "said" insert --counter--;line 13, change "representation" to --representative--; line 21, change "group" to --groups--; line 33, change "transmited" to --transmitted--; line 39, change "outpur" to --output--.

Signed and Sealed this

Sixth Day of July 1976

[SEAL]

*Attest:*

RUTH C. MASON
*Attesting Officer*

C. MARSHALL DANN
*Commissioner of Patents and Trademarks*